United States Patent [19]

Ivey et al.

[11] 4,063,623

[45] Dec. 20, 1977

[54] FLUID COUPLING WITH CENTRIFUGAL AND TORQUE RESPONSIVE LOCK UP CLUTCH

[75] Inventors: John Saxon Ivey, Bloomfield Hills, Mich.; Russell Earl Silberschlag, Glen Ellyn, Ill.

[73] Assignee: Borg-Warner Corporation, Chicago, Ill.

[21] Appl. No.: 700,998

[22] Filed: June 29, 1976

[51] Int. Cl.$^2$ .................. F16H 45/02; F16D 43/14
[52] U.S. Cl. ............................. 192/3.31; 192/103 B; 192/54
[58] Field of Search ............. 192/105 BA, 103 B, 54, 192/3.31

[56] References Cited

U.S. PATENT DOCUMENTS

| | | | |
|---|---|---|---|
| 1,556,299 | 10/1925 | Obermoser | 192/105 BA |
| 2,106,423 | 1/1938 | Lavaud | 192/3.31 |
| 2,184,606 | 12/1939 | Lavaud | 192/3.31 X |
| 2,370,199 | 2/1945 | Schuckers | 192/105 BA |
| 2,691,437 | 10/1954 | Dalrymple | 192/105 BA |
| 2,718,294 | 9/1955 | Armstrong | 192/105 BA |
| 3,025,939 | 3/1962 | Moule et al. | 192/105 BA |
| 3,696,901 | 10/1972 | Henry | 192/105 BA |

FOREIGN PATENT DOCUMENTS

| | | | |
|---|---|---|---|
| 894,201 | 4/1962 | United Kingdom | 192/3.31 |

Primary Examiner—Benjamin W. Wyche
Attorney, Agent, or Firm—Robert L. Zieg

[57] ABSTRACT

A speed-responsive engaging mechanism, adapted for use in a hydrodynamic device to couple the turbine and impeller members, including a disc secured to the turbine member having a series of cam surfaces formed in apertures in the periphery thereof with a series of engaging devices or friction shoes in said pockets. The friction shoes engage with the impeller member at a predetermined speed of rotation of the turbine element. The cam means will induce a wedging engagement of the shoes upon further increase of speed. A spring is carried by each shoe urging them toward a disengaged position and retaining the shoes in the apertures.

14 Claims, 8 Drawing Figures

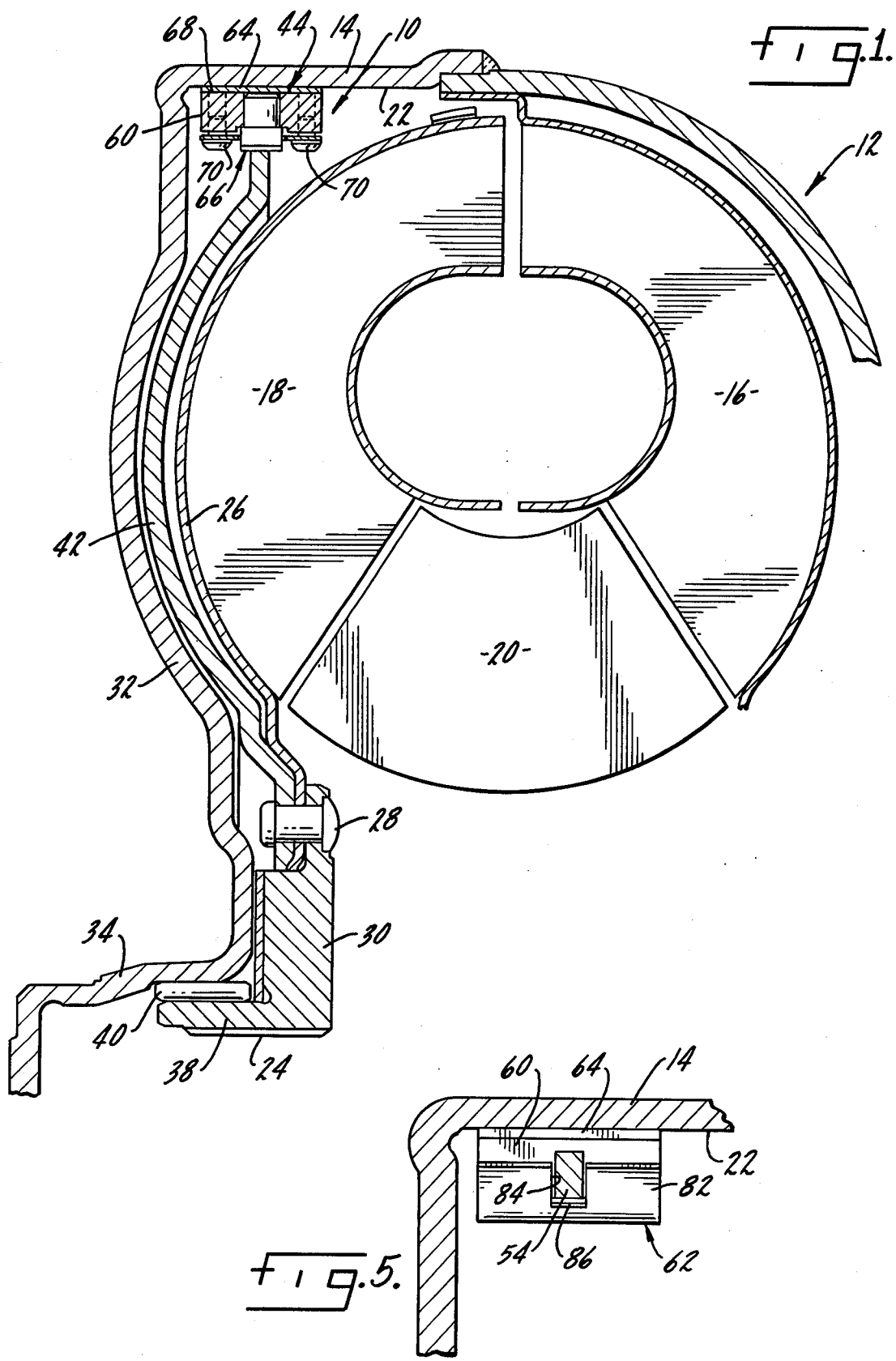

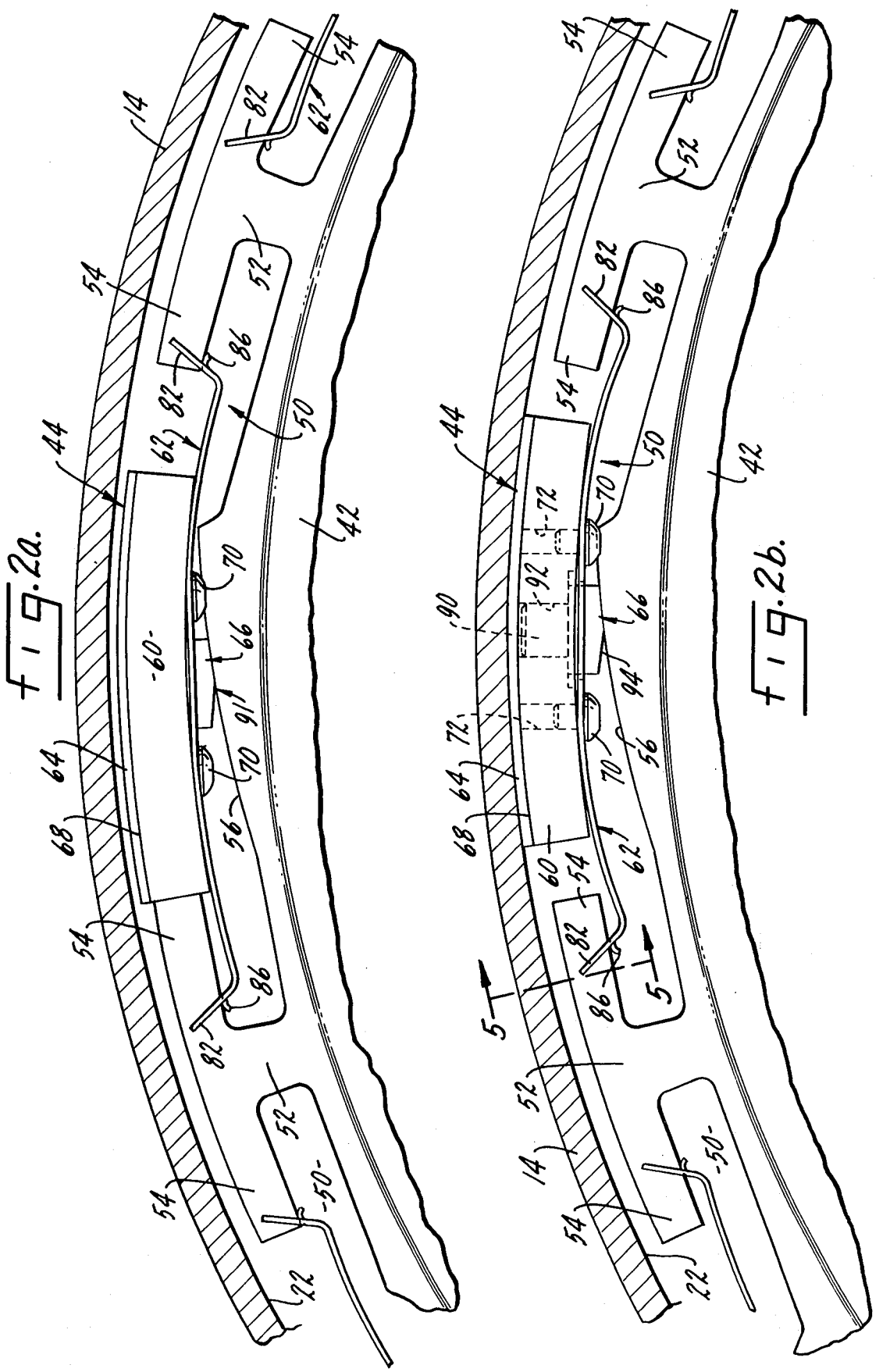

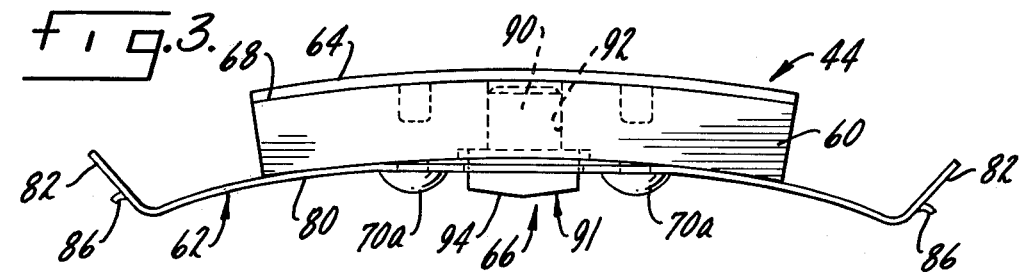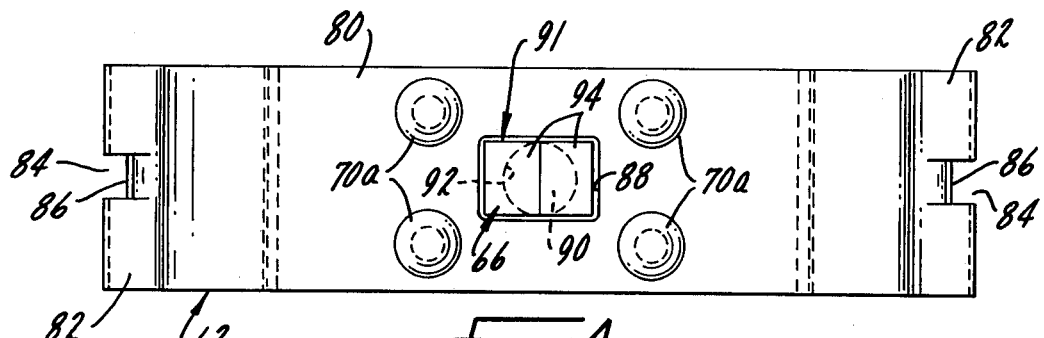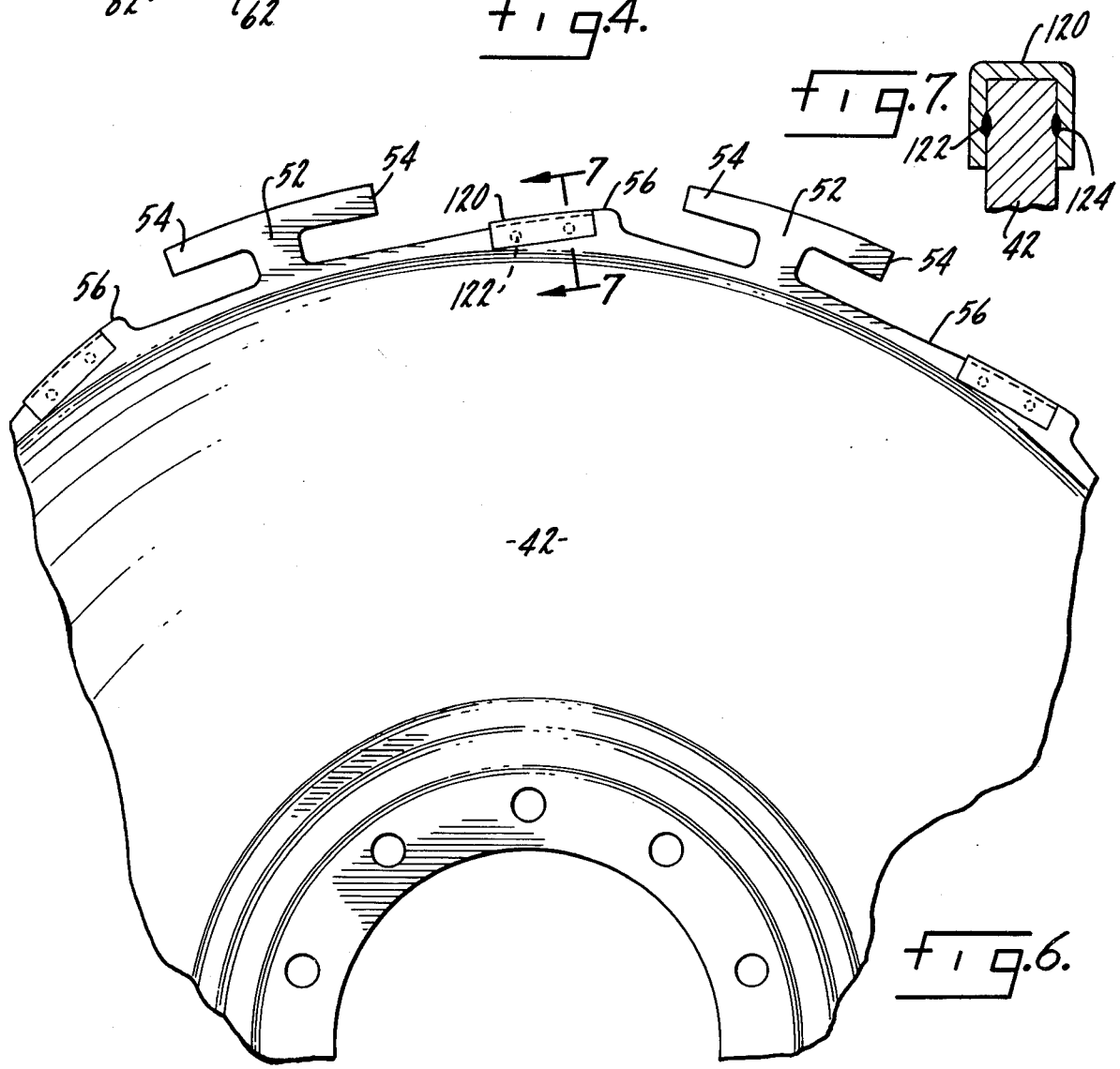

FLUID COUPLING WITH CENTRIFUGAL AND TORQUE RESPONSIVE LOCK UP CLUTCH

BACKGROUND OF THE INVENTION

1. Field of the Invention

This application relates to the field of speed-responsive engaging devices such as clutches.

2. Prior Art

It has been known in the prior art that it is desirable to have a clutch to lock the impeller and turbine elements of a hydrodynamic device together to eliminate slippage therebetween under certain conditions to improve the efficiency of the device. It is further known that it is convenient to use the speed of rotation of an element as a signal to initiate engagement and disengagement of the clutch. The engagement is critical, for example, when the lock-up clutch is used in a hydrodynamic device in combination with an automatic transmission. During an automatic ratio change, it is desirable the clutch be disengaged so that torque changes occurring during the shift will not be harsh, due to the hydrodynamic device absorbing shocks. If the clutch in the hydrodynamic device remains engaged during a shift, the shift control to provide smooth shifts is more exacting since the normal shock absorbing characteristics of the hydrodynamic device is eliminated. If the prime mover has objectionable torsional vibrations, it is equally important to utilize the shock absorbing characteristics of the hydrodynamic device at times.

One solution to this problem is illustrated in application Ser. No. 620,461, filed Oct. 7, 1975, of common assignee. This previous solution provided a lock-up clutch for a hydrodynamic device of a simple design which was operative to engage and disengage at the proper time without the use of external control mechanisms to determine the points of engagement and disengagement. Further, the structure of the previous application provided a lock-up clutch for a hydrodynamic device which automatically permits speed differentials within the device during specific operating conditions such as ratio change. The prior application, however, required welding or fixing of a sheet metal ramp structure to the external turbine surface which creates difficulty in that the turbine surface is normally not dimensionally controlled to the point that a perfectly operating clutch was possible in each manufactured structure. In addition, this prior solution had limited surface area on the friction surface due to interruption thereof by the spring utilized. Further, the structure required contact of the shoe over its entire lower surface with the cam requiring a wedgeshaped shoe involving machining of the lower surface of the shoe.

SUMMARY OF THE INVENTION

The present invention achieves the above-enumerated objectives by utilizing a speed and torque responsive, self-energizing wedge type, engagement of friction shoes. An annular disc is secured to the turbine member of a hydrodynamic device and said disc has formed therein a series of apertures each containing a friction shoe with a friction lining thereon. Centrifugal force moves the shoes radially outwardly to engage an inner annular surface on the impeller drive member. A series of springs are engaged with the disc and attached to the friction shoes to resist their outward radial movement and determine the initial engaging speed of the clutch.

After initial frictional engagement of the shoes, cams in the apertures in which the shoes are mounted provide a wedging effect to urge the shoes into engagement. A hysteresis effect is provided, since the shoes will disengage the wedging action at a lower speed of rotation than that at which they engaged.

In addition to the hysteresis effect of the wedging engagement, the present invention further provides a torque-sensitive function. It has been found that in torque surges which will occur on upshifts in an automatic transmission, the capacity of the lock-up clutch is such that it will momentarily permit speed difference between the impeller and turbine elements. Additionally, in torque reversal conditions, such as may occur during a down shift when the torque tends to flow momentarily from the turbine member to the impeller member as opposed to the normal flow from the impeller member to the turbine member, the friction shoes momentarily permit speed difference between the impeller and turbine members. It is to be understood that such permission of speed difference (or slipping) between turbine and impeller elements by the lock-up clutch will be characterized herein as a release of the clutch, although the friction shoes may remain in contact during this condition. The automatic release during ratio change is extremely important to maintain the shock absorbing function of the torque converter during such ratio changes.

In addition, the present invention provides a torque converter clutch which has a disc connected to the turbine member by rivets or otherwise, which provides an easy method for producing clutches of various capacities in that different discs may be used in which the shape and/or angle of the cam surface on the discs which engage the friction shoes may be varied to provide varying torque capacity limits for the clutch whereby the clutch can be tailored for use in different engine-transmission vehicle combinations. Also, the number of shoes may be varied to vary the torque capacity of the clutch.

Further, as contrasted to the clutch of the previous application Ser. No. 620,461, the friction shoes of the present invention will disengage uniformly from the outer annular clutch surface rather than tilting during disengagement as was possible in the previous structure. The friction shoe assembly of the present invention has a spring attached thereto which engages with the disc at either end of the assembly, thus assuring that the shoe assembly will move inwardly away from the outer clutch surface equadistantly since the spring acts on the assembly at either end thereof. This prevents possible excess wear on one end of the friction shoes which can occur if one portion of the shoe disengages before another.

In addition, by having the spring mechanism attached to the lower portion of the weight or friction shoe, the entire outer surface of the shoe is utilized as a friction surface whereas in the former device, less friction surface area was active since the spring device used engaged the outer friction surface of the shoe and interrupted the surface.

Further, the present invention provides a contact button on the lower part of the shoe which engages the cam on the disc whereby the button may be economically made of a high wear-resistant material and the shoe made of a much cheaper type of steel and/or like material. Further, the use of the cam follower or button of the type disclosed herein allows the friction shoe to lock and/or self-align with respect to the outer friction clutch surface as the shoe is engaged, which movement was impossible with the former construction which had the entire lower surface of the shoe engaged with a cam or ramp.

A further advantage is provided with the subject invention in that by use of cams on a disc member as compared to cams on a relatively wide sheet metal member, the cams can be curved with minimal additional expense in the manufacturing process, and thus provide varying slopes to the cam and change the clutch engaging characteristics by varying the rate of radial displacement of the shoe with respect to arcuate movement of the cam along various portions of the cam.

Further, comparing to the earlier filed application, a single spring can be used to provide the retracting functions which require two springs in the earlier above-mentioned application. In addition, the friction shoe assembly is symmetrical, thus assuring that it cannot be assembled backwards in the disc member. By having the friction shoe and spring as a subassembly, assembly of the friction devices to the disc is simplified.

BRIEF DESCRIPTION OF THE DRAWINGS

FIG. 1 is a cross-sectional view through a hydraulic torque converter structure having a speed-responsive clutch embodying the principles of the present invention;

FIG. 2A is a cross-sectional view taken along the lines 2—2 of FIG. 1;

FIG. 2B is a view similar to FIG. 2A showing the weight assembly in engaged position;

FIG. 3 is a partial sectional view of a modified form of weight assembly for the device of FIG. 1;

FIG. 4 is a bottom view of the weight assembly of FIG. 3;

FIG. 5 is a sectional view taken along the lines 5—5 of FIG. 2;

FIG. 6 is a view of a modified disc member for use in the clutch of FIG. 1; and

FIG. 7 is a view along lines 7—7 of FIG. 6.

BRIEF DESCRIPTION OF THE PREFERRED EMBODIMENT

Referring to FIG. 1, an improved lock-up clutch or engaging mechanism 10 is illustrated. The clutch 10 is shown in location in a hydrodynamic device 12 of the type normally referred to in the prior art as a hydraulic torque converter having a drive shell 14 connected to drive a vaned impeller member 16 in a known manner. The hydraulic torque converter 12 includes a vaned turbine member 18 driven hydrodynamically by impeller 16 and a stator member 20. Improved lock-up clutch 10 is operative to lock the turbine 18 to the impeller 16 by means of frictional engagement between the clutch 10 and an internal annular surface 22 of shell 14. As is known in the prior art, the shell 14 is connected to the vehicle engine to be driven thereby. The turbine 18 is splined at 24 to be connected to a transmission input shaft to drive same in response to rotational drive of the turbine by the impeller.

The turbine 18 has an outer radial vaned portion 26 which is connected by rivets 28, for example, to an inner hub 30. The drive shell 14 has a radial portion 32 which is connected to a central hub portion 34. The radial portion 32 is curved to generally conform to the shape of turbine 18. The hub 30 of turbine 18 includes an axially extending bearing portion 38 which is journalled in the hub 34 of shell 14 in a bearing 40, for example. Thus, the turbine 18 is supported for rotation within the drive shell 14 insuring concentric rotation of the shell 14 and impeller 16 and turbine 18.

The unique clutch 10 of the present invention is comprised generally of an annular curved disc 42 and weights or friction shoe assemblies 44. The disc 42 is concentrically mounted on hub 30 of turbine 18 and is secured thereto, for example, by rivets 28 for rotation with turbine member 18. Annular disc 42 is curved as illustrated in FIG. 1 to generally conform with the shape and curvature of turbine 18 and provide minimum space requirements to accommodate disc 42 and clutch 10.

Referring to FIG. 2, the disc 42 includes a series of apertures 50 on the periphery thereof. The formation of the apertures is such that a series of "T"-shaped projections 52 on either side of an individual aperture 50 define tabs 54 extending radially over the end portion of the apertures 50. The tabs 54 cooperate with shoe assemblies 44 to retain same within apertures 50. Also provided centrally of the apertures 50, in each aperture, is a cam or wedge or ramp surface 56 which is adapted to engage shoe assemblies 44 and provide a wedging or self-energizing engagement of the shoes with the surface 22 on shell 14. The cam surfaces 56 may be curved as illustrated for purposes to be discussed later.

The friction shoes or weight assemblies 44 are particularly illustrated in FIGS. 3 and 4. The shoe assemblies 44 are mainly comprised of a rectangular shoe 60 which is formed in a generally arcuate shape conforming generally with the arcuate shape of the surface 22. The shoe 60 has assembled thereto a spring 62, a friction lining 64 and a contact button or cam follower insert 66. The friction lining 64 is bonded to the external convex arcuate surface 68 on the shoe 60. The friction lining may be of a paper or other type known in the art.

The spring 62 is secured to the shoe by screws 70, for example, received in screw threaded bores 72. The screws 70, for example, may be four in number and are received through holes pierced in the spring 62. As shown in FIG. 3, optionally rather than using screws 70, rivets 70a may be pushed from the material of the shoe 60 itself, over which rivets the springs are placed, and then the rivets upset or deformed to secure spring 62 to shoe 60 as illustrated.

The spring 62 includes a central body portion 80 with bent-up end portions 82 which have slots 84 therein within which the tabs 54 are received. Bent out of the slotted portion 84 are lips 86. The spring further includes a central aperture 88 which is designed to accommodate the cam follower insert 66.

The insert 66 is comprised of a shaft part 90 received within an appropriately sized hole 92 in the shoe 60. The insert 66 has a larger rectangular portion 91 having a pair of engagement surfaces 94 thereon which are adapted to act as cam or wedge follower surfaces. One of the surfaces 94 will engage the cam 56 to effect operation of the shoe 60 as will be described. Optionally, the cam follower 66 may be formed out of the material of the shoe 60, similar to rivets 70a, by pushing some of the material inwardly from the outermost surface of the shoe 60 and then forming the pushed-out material into an approximate shape and appropriately finished or machining to form engaging surfaces 94.

The unique weight or friction shoe assembly 44 may be first assembled outside of the torque converter mechanism 12 by bonding the friction lining 64 thereto and then securing the spring assembly and insert 66 thereto as described above. The entire weight assembly 44 is then assembled in the apertures 50 in a manner as illustrated in FIG. 2 with the slotted portions 84 of spring 62 accommodating tabs 54 and the lips 86 engaging the tabs 54. The length of the spring as compared to the length of the shoe 60 is such that when the assembly 44 is in its fully retracted position to the left as illustrated in FIG. 2A, portion 82 of spring 62 on the right as illustrated will still have lip 86 engaging tab 54. Tabs 86 thus serve to retain the assembly 44 in the aperture 50 under all conditions. In addition, the springs are formed and tempered such that they act to move or urge the assembly 44 radially inwardly as illustrated in FIG. 2, resisting outward movement of the assembly 44.

The operation of the improved clutch mechanism 10 for use in a hydrodynamic device 12 is that initially the assembly 44 is in the position illustrated in FIG. 2 when the turbine 18 is not rotating, there being no centrifugal force. As the impeller 16 is rotated, turbine 18 begins to rotate, and as the rotational speed of turbine 18 increases, assemblies 44 will tend to move outwardly in response to centrifugal force. When the shoes 60 and the friction material 64 thereon engage surface 22, the initial engagement will cause the assembly 44 to move with respect to the disc 42 along cams 56 and due to the action of the wedge or cam surface 56 as contacted by follower 66, the shoes 60 will thus be wedged into engagement with surface 22 to lock the turbine 18 to the shell 14 of impeller 16 for rotation together as a unit. The unique torque converter clutch 10 of the present invention will release under several conditions which are desired in a clutch of this type. The release and re-engagement of the clutch 10 occurs due to this inherent structure without the requirement of any outside controls.

It is to be understood that the use of the term "disengaged" herein is meant to indicate a condition in which shoes 60 move radially inwardly out of contact with surface 22. When the term "released", as applied to clutch 10, is used herein, it is intended to include a condition in which shoes 60 may still be in contact with surface 22 but the engaging forces are such that slipping of surface 22 with respect to shoes 60 may take place or, in other words, turbine 18 and impeller 16 may rotate at different speeds.

Due to the design of clutch 10, when the clutch is locked up during operation of the vehicle and the throttle of the vehicle is suddenly depressed to demand higher torque, the drive-line torque will rise to a greater value than the torque capacity of clutch 10 causing clutch 10 to release and allowing the hydraulic torque converter to return to slipping condition, which is desired at such times. This condition may also occur on upshifts in the transmission when a sudden surge or increase in torque will occur momentarily.

When a torque reversal occurs in the drive-line, due to the inherent characteristics of clutch 10, the wedging effect is removed, and the torque capacity of clutch 10 drops to a lower value. Thus, the clutch momentarily releases on down shifts, since a torque reversal may occur at such times. As known in the art, during shifting, release of clutch 10 is desired to allow the converter to return to its shock absorbing characteristics.

It has also been illustrated during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a conventional lock-up clutch at the time of the shift, the shift could be much harsher than desirable.

The operational characteristics of the torque converter clutch as set out above are more fully explained in the above-mentioned copending application, Ser. No. 620,461, filed Oct. 7, 1975, and reference may be had thereto for a fuller understanding of such characteristics.

It is to be noted that upon engagement of shoes 60 with surface 22, the weights can rock on the cam surface 56 to self-align with respect to the clutch surface 22.

As mentioned above, cam surfaces 56 are curved, and since surfaces 94 on cam follower 66 are relatively flat, there is line contact between follower 66 and cam surface 56. The purpose of having cam surface 56 curved is to maintain a uniform wedge angle regardless of the position of the friction shoe along the cam surface. As will be recognized by those of ordinary skill in the art, the wedge angle is the angle between a radius drawn from the center of curvature of surface 56 through the point of contact between surface 56 and surface 94 and a radius drawn from the center of rotation of internal clutch surface 22 and the point of contact between surface 94 and surface 56. It will also be recognized by those skilled in the art that if cam surface 56 is a flat surface, the wedge angle will vary significantly as the friction shoe moves along surface 56. It will be readily apparent that for the device to function best, it is important to have a constant wedge angle to maintain constant torque capacity even with dimensional variation of the parts.

The wedge angle used, which can be established by varying the curve of surface 56, may be selected from a wide range of angles, the major requirement being the wedge angle must be greater than the angle of friction for the device to engage and disengage properly. As is known, the friction angle is a specific angle for particular types of materials in engagement, being the angle of inclination to an inclined plane on which a body will just overcome its tendency to slide, the inclined plane and the body being of the materials for which the friction angle is to be established.

In FIGS. 6 and 7, an optional form of disc 42 is illustrated in which a U-shaped cap 120 is provided fitted over the cam portions of disc 42. Preferably, caps 120 would be secured to disc 42 by spot welding as indicated at 122 and 124. However, it is contemplated that caps 120 could be assembled to the discs in any known manner as by interlocking tabs or adhesive processes. The function of caps 120 is to provide an engaging surface for shoes 60 of high-wear characteristic, it being contemplated that caps 120 would be constructed of higher quality steel than that used in disc 42, for example, a steel of the type used in bearing structures. The use of caps 120 should provide longer useful life for clutch device 10 by preventing wear at the engaging surface of disc 42.

It should be understood that optional to use of caps 120, cam surfaces 56 may have improved wear resistance by heat treating the cam surfaces as, for example, by a carburizing process or equivalent methods. Of course, the method to be used to improve the wear resistance of surface 56 will depend upon the economies between the various heat treating processes and the use of a cap or insert, such as caps 120, which further depends upon the unit volume of production contemplated and thus the type of machinery which can be used most economically.

It should be understood that although clutch 10 is illustrated in a particular position in a hydraulic torque converter, the clutch can be conveniently incorporated in other locations as, for example, within the core ring of the torque converter or, for example, on an inner diameter with respect to the torque converter in the area of hub 30. It is apparent that certain designs of torque converters would require that the clutch 10 be relocated.

It should also be apparent that shoes 60 of the present invention can be made of a material, or the material of the shoe, as compared to the material of clutch surface 22 may be such that no friction lining such as lining 64 is required.

From the above, it will be apparent that the present invention provides a speed-responsive clutch which achieves unique results as a lock-up clutch for a hydrodynamic device having all the desired operating characterisitics for a clutch in this environment yet using a minimum of parts. These characteristics achieved by the present invention are: lock up of turbine and impeller elements at proper times; release during automatic ratio change to use the natural shock absorbing features of the hydrodynamic device; no hunting between engaged and released conditions; smooth engagement and disengagement; no requirement for complex mechanical, hydraulic or electronic speed-sensitive controls to properly time engagement and disengagement; self-aligning capability of the friction shoes upon engagement to minimize wear on the outer frictional surface; and uniform disengagement of the shoes along the circumferential extent thereof to further minimize uneven wear of the friction shoes.

Various features of the invention have been particularly shown and described. However, it should be obvious to one skilled in the art that modifications may be made therein without departing from the scope of the invention.

What is claimed is:

1. An engaging mechanism comprising a relatively thin disc member attached to a first rotating member, said first rotating member rotating within a second rotating member, said disc having a plurality of peripheral apertures each having a friction device mounted therein, said apertures being partly defined by a cam surface engaged by said friction devices during operation of said engaging mechanism, said apertures further including retaining means engageable by retaining means secured to said friction devices to retain said friction devices in said apertures, whereby centrifugal force will urge said friction devices into engagement with said second rotating member and said cam means will act after initial engagement to induce a wedging engagement of said friction devices between said rotating members.

2. A mechanism as claimed in claim 1 wherein said cam means comprises a surface curved so as to develop a uniform wedge angle of engagement between said surface and said friction devices is provided regardless of the position of said shoes along said surface.

3. A mechanism as claimed in claim 1 wherein said means on said friction devices retaining said devices on said disc comprise spring means secured to said devices.

4. A mechanism as claimed in claim 3 wherein said apertures include tab means and said spring means engaging said tab means.

5. A mechanism as claimed in claim 4 wherein said spring is a leaf-type spring.

6. A mechanism as claimed in claim 1 wherein said friction devices have an arcuate engaging surface on one side thereof having a friction lining bonded thereto and said spring being secured to the other side thereof.

7. A mechanism as claimed in claim 6 wherein said friction device includes a follower insert secured thereto adapted to engage said wedging surface.

8. A friction shoe assembly for use in a centrifugal clutch of the self-energizing type having a thin disc with apertures therein, said apertures including a cam surface engageable with the shoe, comprising an elongated arcuate shoe having a friction lining bonded thereto, said shoe further including a one-piece spring and retaining mechanism secured thereto said spring extending longitudinally from either end thereof, said spring being adaptable to engage with structure to retain said shoe in said aperture, and said shoe further including a cam follower insert secured in said shoe and adapted to engage said cam surface to provide the self-energizing feature.

9. A friction shoe mechanism as claimed in claim 8 wherein said projections are formed from the material of said shoe on one side thereof, said spring being secured to said shoe by deforming said projections.

10. A friction shoe mechanism as claimed in claim 8 wherein said follower is an insert comprised of a hardened wear-resistant material.

11. A lock-up clutch mechanism for a hydraulic torque converter, said torque converter including an outer driving shell connected to drive a rotating impeller member and a driven rotating turbine member, said turbine member having a hub piloted in said driving shell, a relatively thin annular disc connected to said hub of said turbine, said disc having retained on the periphery thereof a plurality of friction shoes, said shoes being mounted in a series of apertures on the periphery of said disc, means on said friction devices engaging said disc to retain said shoes in said aperture, cam means in said aperture in engagement with said shoes acting after initial engagement of said shoes with said driving shell to wedge said shoes between said disc and said shell to lock said disc and shell together for rotation.

12. A lock-up clutch as claimed in claim 11 wherein said means retaining said shoes comprises a leaf-type spring secured to said shoes.

13. A lock-up clutch as claimed in claim 12 wherein said apertures include a tab structure and said spring engaging said tab structure to retain said shoes in said aperture and resist outer radial movement of said shoes.

14. A lock-up clutch as claimed in claim 11 wherein said cam means comprises a curved surface whereby a uniform wedge angle of engagement between said surface and said shoes is provided regardless of the position of the shoes along said surface.

* * * * *